(12) United States Patent     (10) Patent No.: US 8,677,915 B2
Riggs     (45) Date of Patent: Mar. 25, 2014

(54) SEED RETRIEVAL APPARATUS AND METHOD

(75) Inventor: Brian L. Riggs, Evansville, IN (US)

(73) Assignee: Pioneer Hi Bred International Inc, Johnston, IA (US)

( * ) Notice: Subject to any disclaimer, the term of this patent is extended or adjusted under 35 U.S.C. 154(b) by 336 days.

(21) Appl. No.: 13/162,341

(22) Filed: Jun. 16, 2011

(65) Prior Publication Data

US 2012/0024207 A1     Feb. 2, 2012

Related U.S. Application Data

(60) Provisional application No. 61/368,186, filed on Jul. 27, 2010.

(51) Int. Cl.
    *A01C 7/00*     (2006.01)
(52) U.S. Cl.
    USPC ............ 111/200; 111/174; 111/171; 111/185
(58) Field of Classification Search
    USPC .......... 111/170–172, 177–185, 200, 174, 175
    See application file for complete search history.

(56) References Cited

U.S. PATENT DOCUMENTS

| | | | | |
|---|---|---|---|---|
| 5,170,730 A | * | 12/1992 | Swallow | 111/174 |
| 6,615,754 B2 | * | 9/2003 | Unruh et al. | 111/181 |
| 6,782,835 B2 | * | 8/2004 | Lee et al. | 111/174 |
| 6,899,042 B1 | * | 5/2005 | Kowalchuk | 111/174 |
| 7,673,572 B2 | * | 3/2010 | Deppermann et al. | 111/200 |

* cited by examiner

*Primary Examiner* — Alicia Torres
(74) *Attorney, Agent, or Firm* — Pioneer Hi-Bred Int'l, Inc.

(57) ABSTRACT

A seed retrieval apparatus for use with a seed planting device having row planters may be used in instances of mechanical failures of the seed planting device and/or planting errors. The seed retrieval apparatus may include a discard hopper located on the seed planting device which is configured to receive discard seed from the row planters. Further, seed discard tubes of the seed retrieval apparatus each define a first end in fluid communication with a respective row planter and a second end in fluid communication with the seed discard hopper. Additionally, seed containers respectively couple to the second ends of the seed discard tubes, wherein each seed container is configured to receive and isolate discard seed from a respective row planter. Accordingly, the discard seed may be repackaged and planted.

8 Claims, 6 Drawing Sheets

SEED RETRIEVAL APPARATUS AND METHOD

CROSS-REFERENCE TO RELATED APPLICATIONS

The present application claims priority from U.S. Provisional Application No. 61/368,186 filed Jul. 27, 2010, which is hereby incorporated herein by reference in its entirety.

FIELD OF THE INVENTION

Various embodiments of the present invention relate generally to an apparatus and method for retrieving discard seed. More specifically, embodiments of the present invention provide a seed retrieval apparatus and method configured to retrieve discard seed from a seed planting device.

BACKGROUND OF THE INVENTION

It is typical for a company in the agricultural seed industry to generate one or more research plots in order to evaluate certain seed varieties. Such seed varieties may include, but need not be limited to, seeds from a specific source, genotype, population, and/or breeding line. In such a manner, researchers may evaluate characteristics of the plants growing in the research plot, as well as characteristics of any crops produced from the plants. In some instances these characteristics may be compared to plants grown from different seed varieties in the research plot. Thus, certain experiments may require a researcher to plant many different seed varieties in the research plot at approximately the same time. Additionally, a researcher may desire to plant various seed varieties in relatively close proximity to other seed varieties.

Traditional research plot planting is a largely manual process. Conventional techniques involve packaging seed samples in seed packets, which are manually opened at the desired planting locations in order to deposit the seed samples into one or more row planters for planting research plots. In many instances this is accomplished by using a mobile planter transport device, such as a tractor, that transports a research seed planting device configured to carry one or more seed planting operators.

However, in the event of a mechanical malfunction or planting error, for example when an operator drops a seed packet at an incorrect location in the research plot or into an incorrect row planter, the seed currently within the seed planting device may need to be removed before planting can begin again. Present methods of removing the seed from the planting device direct the seed from each row planter to a seed discard hopper where the seed is combined with all of the varieties of seeds from each of the row planters. Evacuation of discard seed to the seed discard hopper in this manner typically occurs after the seed meter from a respective row planter becomes full and hence the additional seed is discarded.

Directing seed to the seed discard hopper as described above does not isolate the seed from each row planter which would be advantageous to reuse the seed in the event of a mechanical problem or planting error. Accordingly, in order to salvage and reuse the seed from each of the row planters, seed removal has instead, in at least some instances, involved manually removing the seed tube from the top of each seed unit to make it possible to vacuum out a range quantity of seed from the trap door of each row planter. Further, access to an additional range quantity of seed retained in a second area of each row planter required additional measures. In this regard, removing the additional range quantity of seed has, at least in some instances, involved manually cycling the discard hopper and gathering the seed off of the metering plate, which may be difficult to access due to tight dimensional constraints. Accordingly, known methods of retrieving seed may involve significant quantities of time and labor.

BRIEF SUMMARY

In one embodiment a seed retrieval apparatus for use with a seed planting device having a plurality of row planters comprises a seed discard hopper located on the seed planting device, the seed discard hopper configured to receive discard seed from the plurality of row planters, a plurality of seed discard tubes, each discard tube defining a first end in fluid communication with a respective row planter and a second end in fluid communication with the seed discard hopper, and a plurality of seed containers respectively coupled to the second ends of the seed discard tubes, wherein each seed container is configured to receive and isolate discard seed from a respective row planter.

The seed retrieval apparatus may further comprise a plurality of adaptors respectively coupled to the second ends of the seed discard tubes, wherein the adaptors are configured to releasably couple the seed containers to the second ends of the seed discard tubes. The adaptors may respectively comprise a plurality of expander sections. Also, the adaptors may each comprise a plurality of vent holes, which may be located above the seed containers. Further, the adaptors may respectively comprise a plurality of elbow sections, which may be disposed such that the seed containers are positioned below the adaptors.

The seed retrieval apparatus may further comprise a vacuum source configured to apply vacuum to the second ends of the seed discard tubes. The vacuum source may comprise a filter configured to prevent removal of the discard seed from the seed discard hopper by the vacuum source. Further, the filter may be centrally disposed with respect to the second ends of the seed discard tubes. Additionally, the seed containers may be sized to hold at least a range quantity of seed. Also, the seed containers may be formed from a plastic material. The seed containers may comprise a plurality of apertures which may be configured to be smaller than the discard seed. Additionally, the first end of each discharge tube may be in fluid communication with a seed meter of the respective row planter.

In a further embodiment a method of retrieving discard seed from a seed planting device having a discard hopper, a plurality of row planters, and a plurality of seed discard tubes each defining a first end in fluid communication with a respective row planter and a second end in fluid communication with the seed discard hopper is provided. The method may comprise coupling a plurality of seed containers to the second ends of the seed discard tubes, such that each second end is coupled to a respective seed container, applying vacuum to the second ends of the seed discard tubes to draw and isolate the discard seed in the respective seed containers from the respective row planters, and retrieving the discard seed from the respective seed containers for the respective row planters.

Retrieving the discard seed from the respective seed containers may comprise removing the respective seed containers from the second ends of the seed discard tubes. The method may further comprise repackaging the discard seed from the respective seed containers for the respective row planters. Additionally, the method may include repeating coupling the respective seed containers to the second ends of the seed discard tubes, applying vacuum to the second ends of the seed discard tubes, and retrieving the discard seed for an additional range quantity of seed for the respective row planters. Applying vacuum to the second ends of the seed discard tubes may comprise applying vacuum to the seed discard hopper which is in fluid communication with the second ends of the seed discard tubes.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
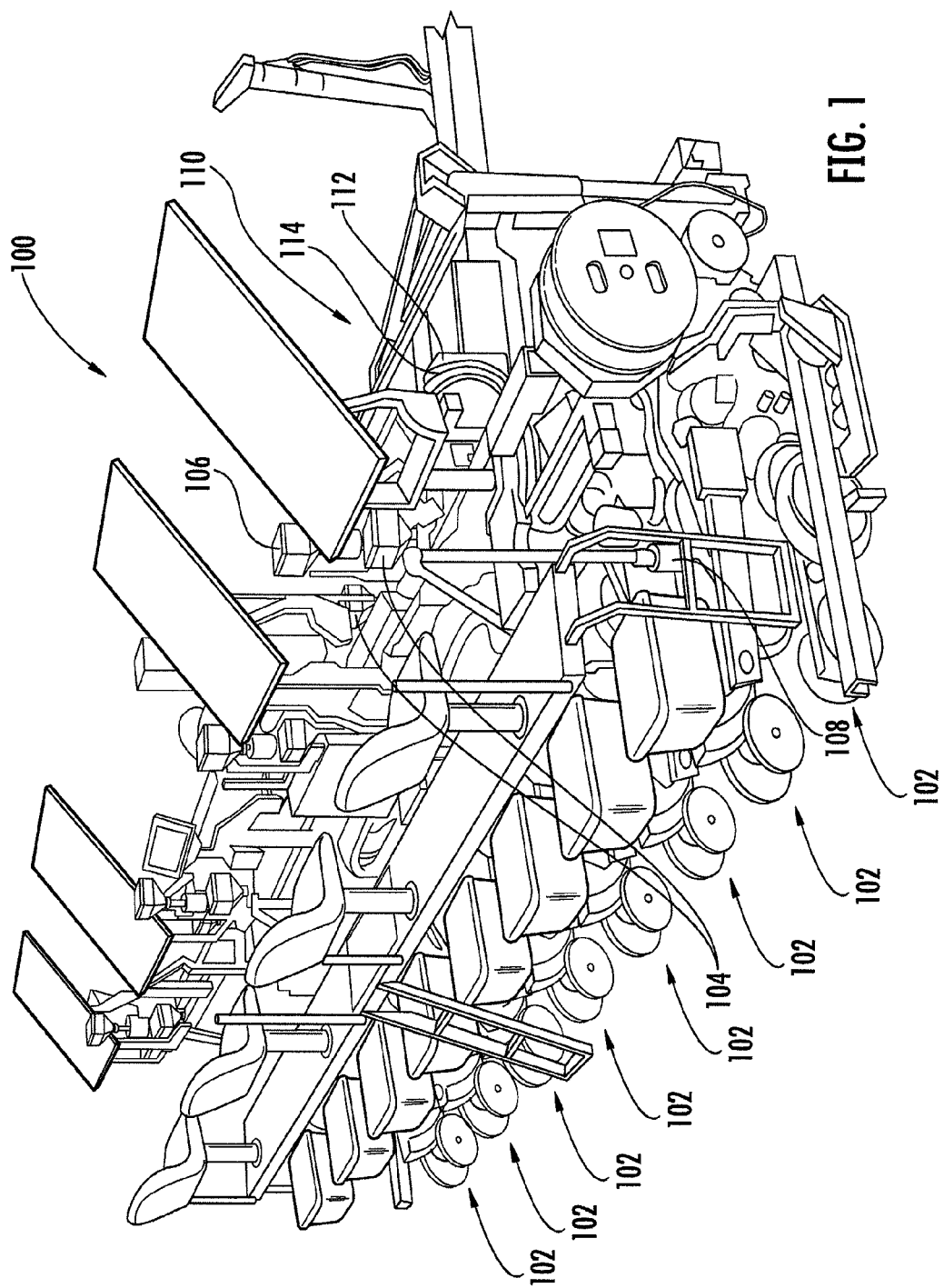
FIG. 1 illustrates an embodiment of a research seed planting device including a seed retrieval apparatus in accordance with an example embodiment of the present invention.

One embodiment of a research seed planting device 100 is illustrated in FIG. 1. In the depicted embodiment, the research seed planting device 100 is configured to be transported via a mobile planter transport device, and is configured to plant a plurality of rows of seed in a research plot for each pass of the research seed planting device. The research seed planting device 100 includes a plurality of row planters 102 which are each configured to plant a row of seed. In the illustrated embodiment, an operator may control two of the row planters 102 and may deposit seeds into separate seed receivers 104 which direct seeds to the two row planters separately, or a combined seed receiver 106 which directs seeds to both of the two row planters. Accordingly, the eight row planters 102 of the illustrated research seed planting device 100 may be configured to simultaneously plant up to a total of eight different types of seed.

After seed is deposited by the operator in the separate seed receivers 104 or the combined seed receiver 106, the seed travels to a seed meter 108 for each row planter 102 which meters the seeds in order to plant the seeds at a desired rate. However, as described in the background, in some instances it may be necessary to remove seed from the row planters 102. Accordingly, a seed retrieval apparatus 110 for use with the seed planting device 100 may be provided. The seed retrieval apparatus 110 may comprise a seed discard hopper 112 which is configured to receive discard seed from the row planters 102. The seed discard hopper 112 may be connected with each of the row planters 102 by a respective seed discard tube 114. Thus, a first end of each seed discard tube 114 may be in fluid communication with a respective row planter 102. For example, each seed discard tube 114 may be in fluid communication with the seed meter 108 of the respective row planter 102. Further, a second end of each of the discard tubes 114 may be in fluid communication with the seed discard hopper 112 such that fluid communication is thereby achieved between the row planters 102 and the seed discard hopper.

Figure 2:
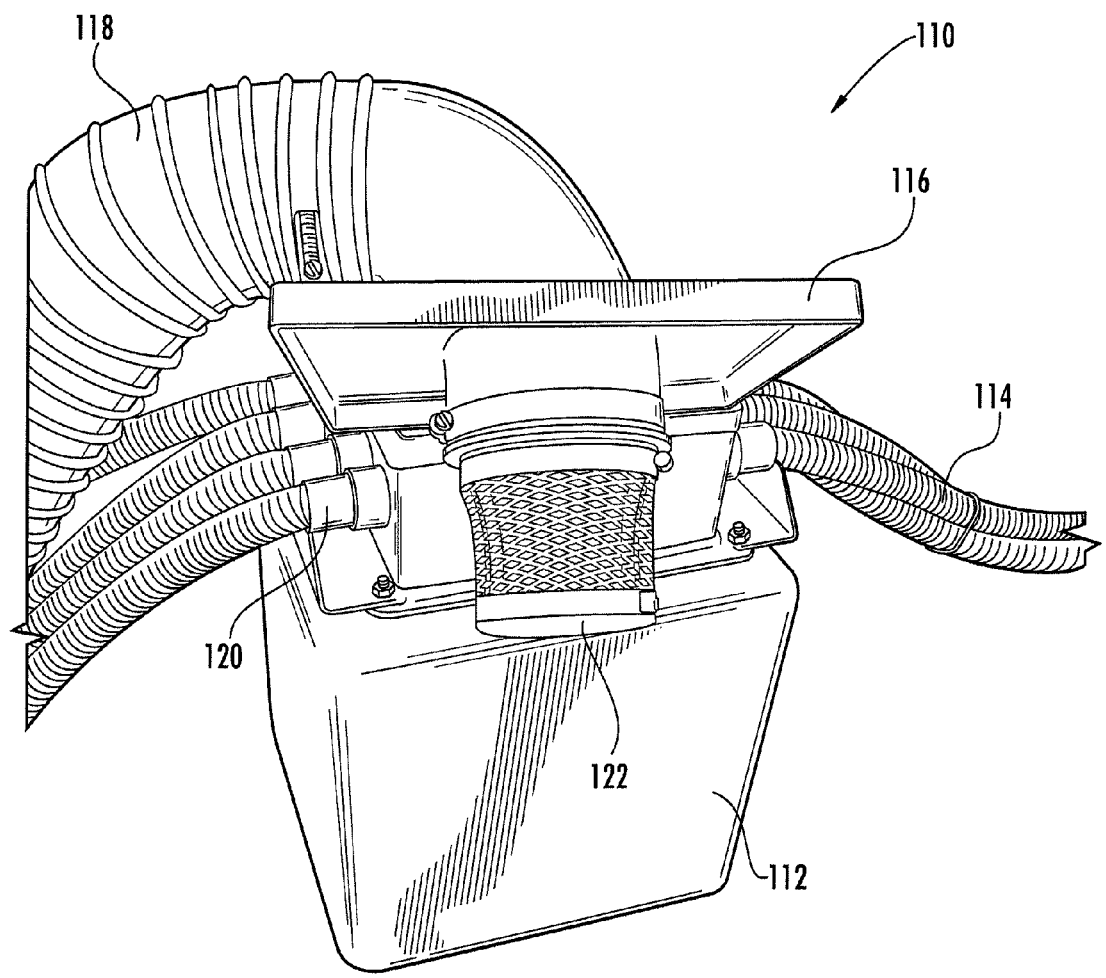
FIG. 2 illustrates an enlarged view of the seed retrieval apparatus of FIG. 1 including a lid and vacuum source in accordance with an example embodiment of the present invention.

Turning now to FIG. 2, the seed retrieval apparatus 110 is illustrated in an enlarged view. In particular, FIG. 2 illustrates the seed discard hopper 112 with a lid 116 removed. As shown, a vacuum source 118 may be configured to apply vacuum to the seed discard hopper 112. In this regard, the vacuum source 118 may connect to the seed discard hopper 112 through the lid 116, as illustrated. Accordingly, when the lid 116 is in place and the vacuum source 118 applies vacuum to the seed discard hopper 112, vacuum is applied to second ends 120 of the seed discard tubes 114 which thereby draws air and discard seed through the seed discard tubes to the seed discard hopper. As illustrated, the vacuum source 118 may comprise a filter 122 configured to prevent removal of the discard seed from the seed discard hopper 112 by the vacuum source. As further illustrated, the vacuum source 118 may connect to the discard hopper 112 such that the filter 122 is centrally disposed with respect to the second ends 120 of the seed discard tubes 114. This arrangement may assist in providing substantially equal vacuum to each of the seed discard tubes 114.

Figure 3:
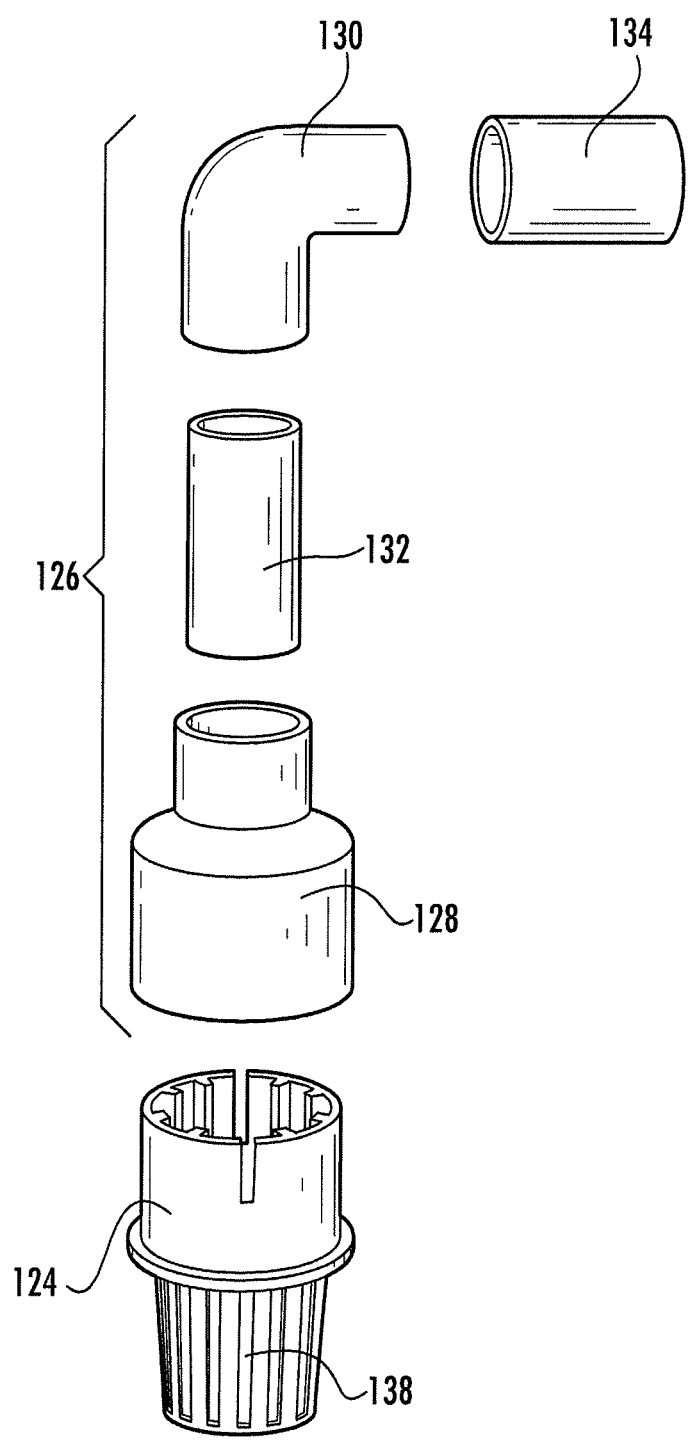
FIG. 3 illustrates an expanded view of an adaptor and seed container comprising the seed retrieval apparatus from FIG. 1 in accordance with an example embodiment of the present invention.

As described above, the seed discard hopper 112 is normally used to evacuate extra seed when the seed meter becomes full. However, the seed retrieval apparatus 110 presented herein provides additional functionality to the discard hopper 112. In this regard, the seed retrieval apparatus 110 includes further components in order to provide for this additional functionality. These components are illustrated in expanded form separately from the remainder of the seed retrieval apparatus 110 for example purposes in FIG. 3. In particular, FIG. 3 illustrates a seed container 124 which is configured to couple to the second end 120 of a seed discard tube 114. Thereby, the seed container 124 is configured to receive and isolate discard seed from a respective row planter 102.

As further illustrated, the seed retrieval apparatus 110 may further comprise a plurality of adaptors 126 which respectively couple to the second ends 120 of the seed discard tubes 114. The adaptors 126 are configured to releasably couple the seed containers 124 to the second ends 120 of the seed discard tubes 114 for reasons which will be explained below. Each adaptor 126 may comprise an expander section 128 which may directly couple to the seed container 124. Connection between the seed container 124 and the expander section 128 may occur through interference fit in some embodiments. In other embodiments other connections are possible including other releasable mechanical connectors such as threaded connections, guide pin connections, etcetera. Each adaptor 126 may further comprise an elbow section 130 which, when attached to the second end 120 of seed discard tube 114 may position the seed container 124 such that the seed container points generally downwardly from the elbow section. Thereby, the elbow section 130 may be disposed such that the seed container 124 is positioned below the adaptor 126 when the seed container is coupled to the adaptor. First 132 and second 134 connector sections may respectively couple the expander section 128 to the elbow section 130, and connect the elbow section to the second ends 120 of the seed discard tubes 114 and complete the adaptor 126.

Figure 4:
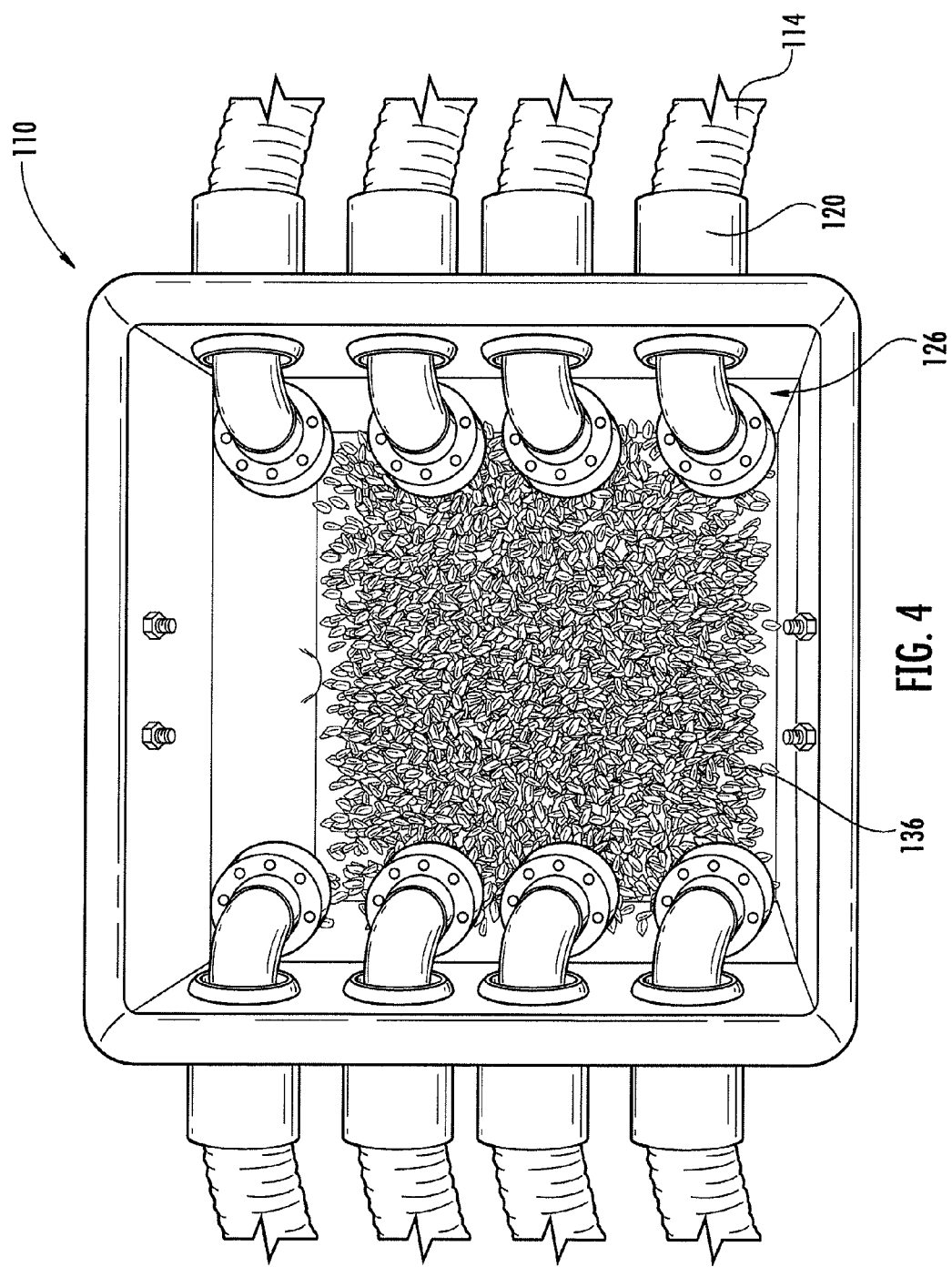
FIG. 4 illustrates the seed retrieval apparatus of FIG. 1 without the seed containers in a normal operation configuration in accordance with an example embodiment of the present invention.

Returning to the seed retrieval apparatus 110 as a whole, FIG. 4 illustrates the seed discard hopper 112 without the lid 116 for clarity purposes. In FIG. 4, the adaptors 126 are coupled to the second ends 120 of the seed discard tubes 114. However, the seed containers 124 are not attached to the adaptors 126. This represents the normal configuration for the seed retrieval apparatus 110 (other than the lid 116 would be in place) during operation of the seed planting device 100. In particular, this configuration may be used to evacuate discard seed 136 from the row planters 102 when the seed meters 108 have more seed than is needed to plant the rows. In such circumstances, the vacuum source 118 produces vacuum which draws the discard seed 136 from the respective row planters 102 through the seed discard tubes 114 and into the seed discard hopper 112 through the adaptors 126. The discard seed 136 from each row planter 102 thereby combines in the discard hopper 112 and may be stored and removed at a later time.

However, as described above, the configuration illustrated in FIG. 4 combines the discard seed 136 from each of the row planters 102 such that the discard seed mixes together. Hence the discard seed 136 is not useable for repackaging and planting because this would require sorting the seed, which may be not be possible in all instances, and in most instances would at least be very time consuming. Accordingly, in case of a planting error or mechanical error, other measures must be taken in order to respectively isolate the discard seed removed from each row planter 102.

Figure 5:
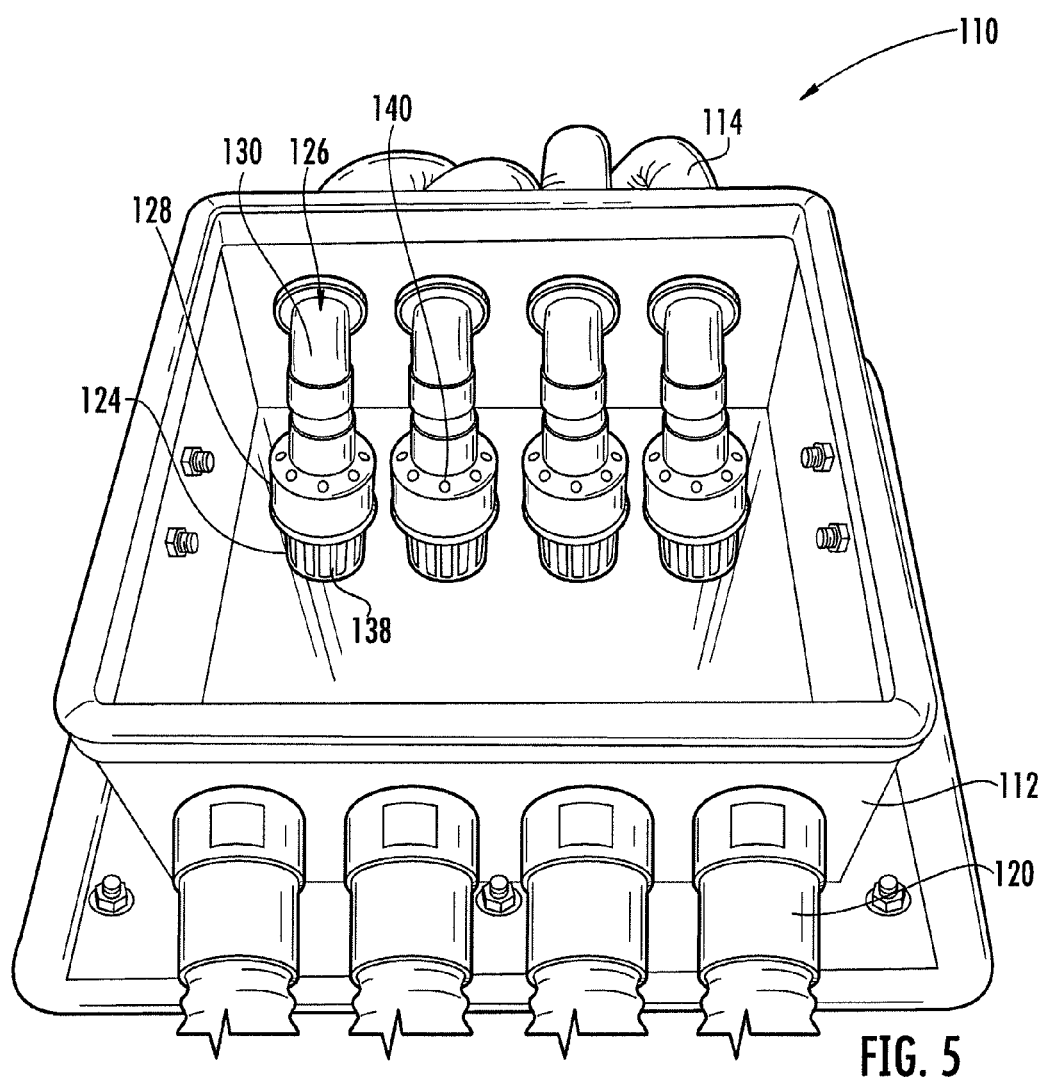
FIG. 5 illustrates the seed retrieval apparatus of FIG. 1 with the seed containers in a seed retrieval configuration in accordance with an example embodiment of the present invention.

In this regard, FIG. 5 illustrates the seed retrieval apparatus 110 in a seed retrieval configuration. However, the lid 116 and vacuum source 118 are not installed on the seed discard hopper 112 in FIG. 5 for clarity purposes. As illustrated, the seed containers 124 are coupled to the second ends 120 of the seed discard tubes 114 by the adaptors 126 when the seed retrieval apparatus 110 is in the seed retrieval configuration. Accordingly, when the vacuum source 118 applies vacuum to the seed discard tubes 114, the seed containers 124 respectively receive and isolate the discard seed from each of the row planters 102. Therefore, with the seed containers 124 coupled to the second ends 120 of the seed discard tubes 114, the discard seed may be separately removed from the respective row planters 102 and repackaged for planting. Note that the term discard seed, as used herein, refers to seed which is removed from the row planters 102 of the seed planting device 100, regardless of what happens to the seed after removal from the row planters. In this regard, the discard seed may be removed from the discard hopper 112 when there is extra seed which is not need as described above with respect to the configuration of the seed retrieval apparatus 110 illustrated in FIG. 4. Alternatively, the discard seed may be retrieved and repackaged for planting as described with respect to the configuration of the seed retrieval apparatus 110 illustrated in FIG. 5.

With further regard to retrieving and isolating discard seed, the seed retrieval apparatus 110 may comprise features intended to assist in these operations. For example, as illustrated in FIGS. 3 and 5, the seed containers 124 may comprise a plurality of apertures 138. The apertures 138 allow the vacuum source 118 to draw air through the seed containers 124 in order to pull seed out of the respective row planters 102 while trapping the discard seed in the seed containers. In this regard, the apertures 138 may be configured to be smaller than the individual seeds comprising the discard seed such that the discard seed is substantially prevented from escaping the seed containers 124.

Further, in some embodiments the seed containers 124 may be formed from a plastic material or other material with elastic properties. Forming the seed container 124 from a material with elastic properties may facilitate coupling the seed container to the adaptor 126 through an interference fit. Further, a seed container 124 formed from an elastic material may be less likely to damage the discard seed when it impacts the seed container as the discard seed is drawn from the seed discard tubes 114. Accordingly, the discard seed may be more likely to retain viability, and further the individual seeds may be more likely to remain intact, and hence less likely to escape through the apertures 138 in the seed containers 124. However, in the event that discard seed does manage to escape from the seed containers 124, the vacuum source 118 is protected from damage which may occur from sucking in a seed as a result of providing the vacuum source with the filter 122 as described above.

Additionally, the seed containers 124 may be sized to hold at least a range quantity of seed. In this regard, the seed planting device 100 may in some embodiments be configured such that the row planters 102 at any given time contain up to a first range quantity of seed which is usable to plant a range of a plot, and a second range quantity of seed which is usable to plant a second range of the plot. However, the seed planting device 100 may keep the first range quantity of seed and the second range quantity of seed separate from one another so that the two range quantities of seeds do not intermix. For example, the second range quantity of seed may be separated from the first range quantity of seed by a trap door. Accordingly, the seed discard tubes 114 may be configured to have access to one of the two range quantities of seed at any given time. Accordingly, the seed containers 124 may be sized such that they are large enough to store the entirety of a range quantity of seed for a row in order to ensure that all of the discard seed may be separately stored by the seed containers prior to repackaging the discard seed.

Further, in some embodiments of the seed retrieval apparatus 110, the adaptors 126 may each comprise a plurality of vent holes 140, which may be located in the expander sections 128 of the adaptors. The vent holes 140 may operate to ensure that even when the seed containers 124 are filling with discard seed, the vacuum source 118 is still able to draw air through the discard tubes 114 to remove any remaining discard seed. In this regard, when the seed containers 124 are filling with discard seed, the discard seed may substantially block the apertures 138 in the seed containers which may reduce the airflow therethrough. Accordingly, the vent holes 140 may operate to assist or supplant the functionality of the apertures 138 in the seed containers 124. However, to ensure that the vent holes 140 do not become blocked by the discard seed, in some embodiments the vent holes may be located above the seed containers 124. Therefore, as the discard seed fills the seed containers 124, the vent holes 140 remain above the discard seed and hence the vent holes may be less likely to clog. This arrangement may be facilitated by configuring the adaptors 126 with respective elbow sections 130 as described above which may position the seed containers 124 below the adaptors.

Accordingly, embodiments of the seed retrieval apparatus 110 as described above may provide seed containers 124 which are each configured to receive and isolate discard seed from a respective row planter 102. Further, embodiments of related methods are also provided herein. In this regard, FIG.

6 illustrates an embodiment of a method of retrieving discard seed from a seed planting device having a discard hopper, a plurality of row planters, and a plurality of seed discard tubes each defining a first end in fluid communication with a respective row planter and a second end in fluid communication with the seed discard hopper. As illustrated, the method may comprise coupling a plurality of seed containers to the second ends of the seed discard tubes, such that each second end is coupled to a respective seed container at operation 200. Further, the method may include applying vacuum to the second ends of the seed discard tubes to draw and isolate the discard seed in the respective seed containers from the respective row planters at operation 202. Additionally, the method may include retrieving the discard seed from the respective seed containers for the respective row planters at operation 204.

Figure 6:
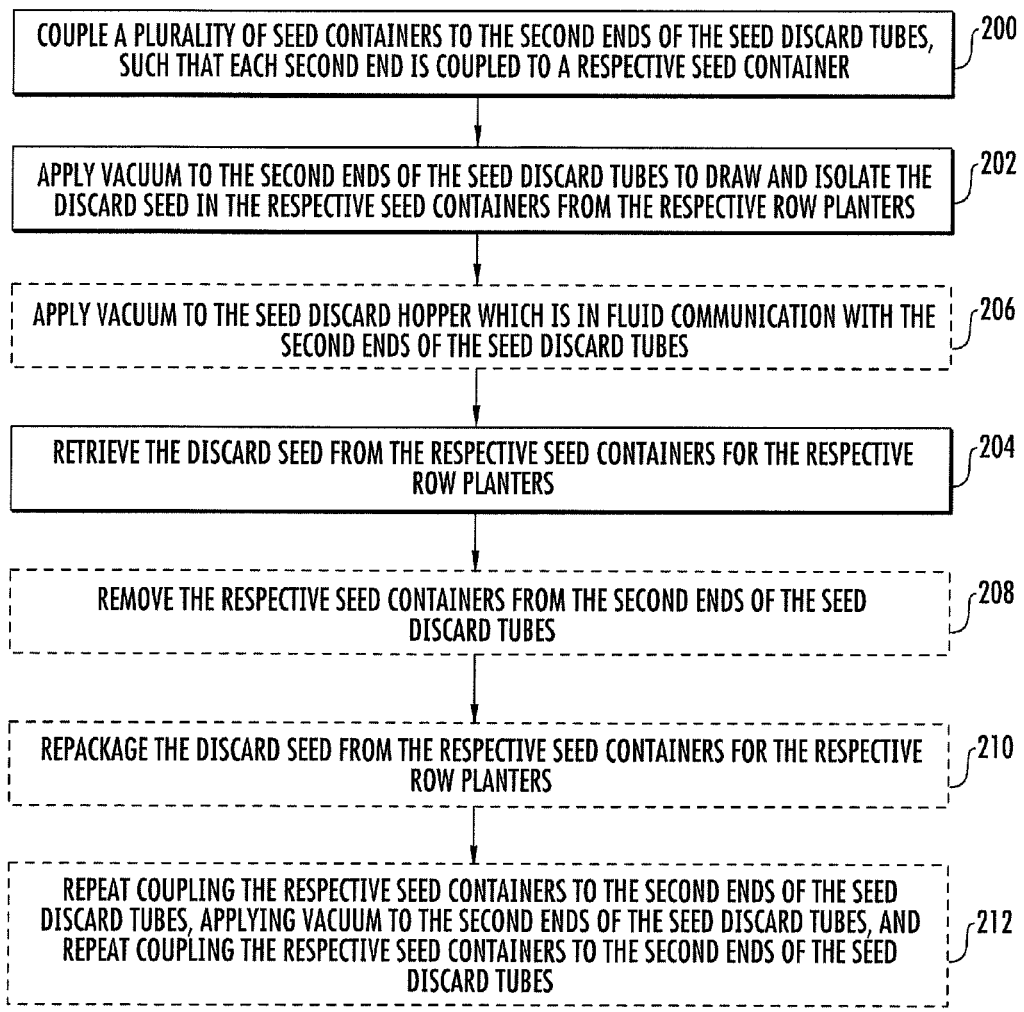
FIG. 6 illustrates a method of retrieving discard seed from a seed planting device in accordance with an example embodiment of the present invention.

In some embodiments the method may additionally or alternatively comprise other operations including those operations illustrated in dashed lines in FIG. 6. For example, the method may further comprise applying vacuum to the seed discard hopper which is in fluid communication with the second ends of the seed discard tubes at operation 206. Additionally, the method may comprise removing the respective seed containers from the second ends of the seed discard tubes at operation 208. The method may also comprise repackaging the discard seed from the respective seed containers for the respective row planters at operation 210. Further, the method may comprise repeating the operation 200 of coupling the respective seed containers to the second ends of the seed discard tubes, the operation 202 of applying vacuum to the second ends of the seed discard tubes, and the operation 204 of retrieving the discard seed for an additional range quantity of the seed for the respective row planters at operation 212. Accordingly, various embodiments of methods of retrieving discard seed from a seed planting device are provided. These methods may preserve the identify of the discard seed such that the discard seed may be planted while also substantially simplifying the seed retrieval operation as compared to prior methods.

Many modifications and other embodiments of the invention set forth herein will come to mind to one skilled in the art to which these invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A seed retrieval apparatus for use with a seed planting device having a plurality of row planters, comprising:
    a seed discard hopper located on the seed planting device, the seed discard hopper configured to receive discard seed from the plurality of row planters;
    a plurality of seed discard tubes, each discard tube defining a first end in fluid communication with a respective row planter and a second end in fluid communication with the seed discard hopper;
    a plurality of seed containers respectively coupled to the second ends of the seed discard tubes,
    wherein each seed container is configured to receive and isolate discard seed from a respective row planter; and
    a plurality of adaptors respectively coupled to the second ends of the seed discard tubes,
    wherein the adaptors are configured to releasably couple the seed containers to the second ends of the seed discard tubes.

2. The seed retrieval apparatus of claim 1, wherein the adaptors respectively comprise a plurality of expander sections.

3. The seed retrieval apparatus of claim 1, wherein the adaptors each comprise a plurality of vent holes.

4. The seed retrieval apparatus of claim 3, wherein the vent holes are located above the seed containers.

5. The seed retrieval apparatus of claim 1, wherein the adaptors respectively comprise a plurality of elbow sections.

6. The seed retrieval apparatus of claim 5, wherein the elbow sections are disposed such that the seed containers are positioned below the adaptors.

7. The seed retrieval unit of claim 1, wherein the seed containers comprise a plurality of apertures.

8. The seed retrieval unit of claim 7, wherein the apertures are configured to be smaller than the discard seed.

\* \* \* \* \*